US009003801B2

(12) United States Patent
Tate (10) Patent No.: US 9,003,801 B2
(45) Date of Patent: Apr. 14, 2015

(54) CONTROL APPARATUS FOR GAS TURBINE AND START UP METHOD FOR GAS TURBINE

(75) Inventor: Takao Tate, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 880 days.

(21) Appl. No.: 13/059,298

(22) PCT Filed: Jan. 25, 2010

(86) PCT No.: PCT/JP2010/050920
§ 371 (c)(1),
(2), (4) Date: Feb. 16, 2011

(87) PCT Pub. No.: WO2011/089729
PCT Pub. Date: Jul. 28, 2011

(65) Prior Publication Data
US 2011/0239657 A1 Oct. 6, 2011

(51) Int. Cl.
*F02C 7/22* (2006.01)
*F02C 7/266* (2006.01)
*F02C 7/26* (2006.01)
*F23N 1/02* (2006.01)
*F23R 3/50* (2006.01)

(52) U.S. Cl.
CPC . *F02C 7/266* (2013.01); *F02C 7/26* (2013.01); *F23N 1/022* (2013.01); *F23N 2027/02* (2013.01); *F23N 2041/20* (2013.01); *F23R 3/50* (2013.01)

(58) Field of Classification Search
USPC .............. 60/39.094, 39.281, 39.37, 734, 739, 60/742, 746, 790
See application file for complete search history.

(56) References Cited

U.S. PATENT DOCUMENTS

| 6,405,524 B1* | 6/2002 | Mistry et al. ............... 60/39.091 |
| 6,681,556 B2* | 1/2004 | Mistry et al. ............... 60/39.094 |
| 6,857,272 B2* | 2/2005 | Summerfield et al. .......... 60/739 |
| 2009/0139241 A1 | 6/2009 | Hirata et al. |

FOREIGN PATENT DOCUMENTS

| JP | 51 71411 | 6/1976 |
| JP | 3 64354 | 6/1991 |
| JP | 10 121986 | 5/1998 |
| JP | 3131805 | 11/2000 |
| JP | 2009 133220 | 6/2009 |

OTHER PUBLICATIONS

International Search Report Issued Apr. 6, 2010 in PCT/JP10/050920 filed Jan. 25, 2010.

* cited by examiner

*Primary Examiner* — Devon Kramer
*Assistant Examiner* — Vikansha Dwivedi
(74) *Attorney, Agent, or Firm* — Oblon, McClelland, Maier & Neustadt, L.L.P.

(57) ABSTRACT

An electronic control apparatus is applied to a gas turbine including a cylindrical combustor, a plurality of fuel injection valves, and an ignition plug. Air compressed by a compressor is supplied to the combustor. The plurality of fuel injection valves are aligned in a circumferential direction in the combustor and are capable of injecting fuel into the combustor. The ignition plug is provided in the combustor and is capable of igniting a fuel-mixture within the combustor. The electronic control apparatus controls the operation of the plurality of fuel injection valves so that when the gas turbine is started up, fuel injection opening times of the #6 and #12 fuel injection valves which are positioned far from the ignition plug are later than fuel injection opening times of the #1 and #7 fuel injection valves which are positioned close to the ignition plug.

10 Claims, 7 Drawing Sheets

CONTROL APPARATUS FOR GAS TURBINE AND START UP METHOD FOR GAS TURBINE

TECHNICAL FIELD

The present invention relates to a control apparatus and start up method for a gas turbine in which a plurality of fuel injection valves are provided to a combustor.

BACKGROUND ART

There is known a gas turbine in which a plurality of fuel injection valves are aligned in a circumferential direction in a combustor (refer to Patent Document 1). In addition, Patent Document 2 is another prior art document related to the present invention.

CITATION LIST

Patent Literature

Patent Document 1: JP-U-3-64354
Patent Document 2: JP-B-3131805

SUMMARY OF INVENTION

Technical Problem

In a gas turbine comprising a plurality of fuel injection valves as shown in Patent Document 1, fuel injected from the fuel injection valves is combusted within a combustor, and the turbine is rotationally driven by the combustion gas. As a start up method for such a gas turbine, a method is known in which fuel is firstly injected from all of the fuel injection valves, and then the fuel is ignited by an ignition apparatus such as an ignition plug or the like to start the combustion of the fuel. In general, a combustor is provided with only about one ignition apparatus. As is well known, a flame generated by ignition propagates so as to spread outward from the periphery of the ignition apparatus. Fuel injected from the fuel injection valves starts to combust from the point in time when the flame reaches it. Therefore, fuel injected from fuel injection valves located far from the ignition apparatus is discharged from the combustor in an uncombusted state until the flame reaches it. Thus, a large amount of uncombusted hydrocarbons may be discharged from the gas turbine during start up. In this start up method, since fuel is discharged in an uncombusted state, fuel is wastefully consumed. Therefore, the fuel consumption is bad.

In view of the foregoing, an object of the present invention is to provide a control apparatus and start up method for a gas turbine which can decrease the amount of uncombusted hydrocarbons which is discharged from the gas turbine during start up and can improve fuel consumption.

Solution to Problem

A control apparatus for a gas turbine of the present invention applied to a gas turbine including a cylindrical combustor in which air compressed by a compressor is supplied, a plurality of fuel injection valves aligned in a circumferential direction in the combustor which are capable of injecting fuel into the combustor, and an ignition device provided in the combustor which is capable of igniting a fuel-air mixture within the combustor, wherein the control apparatus comprising a control device which controls the operation of the plurality of fuel injection valves so that when the gas turbine is started up, fuel injection opening times of the fuel injection valves positioned far from the ignition device are later than fuel injection opening times of the fuel injection valves positioned close to the ignition device.

According to the control apparatus of the present invention, since the fuel injection start up time of the fuel injection valves located far from an ignition device is later, the amount of fuel injected from these fuel injection valves can be decreased during the period until a flame generated around the ignition device reaches these valves. Thereby, since the amount of uncombusted fuel can be decreased, it is possible to decrease the amount of uncombusted hydrocarbons from the gas turbine during start up. The fuel consumption of the gas turbine can also be improved by decreasing the amount of uncombusted fuel.

In one embodiment of the control apparatus for a gas turbine of the present invention, wherein the control device may control the operation of the plurality of fuel injection valves so that the fuel injection valves between the fuel injection valve closest to the ignition device and the fuel injection valve farthest from the ignition device are sequentially opened at prescribed intervals from the fuel injection valve closest to the ignition device toward the fuel injection valve farthest from the fuel injection device. As is well known, a flame generated around the ignition device propagates so as to spread outward from the periphery of the ignition device. In this embodiment, since the fuel injection valves are opened in sequence from the fuel injection valve closest to the ignition device toward the fuel injection valve furthest from the ignition device, the fuel injection valves are opened in the order in which the flame reaches them. Therefore, fuel injected from the fuel injection valves can be rapidly combusted. Accordingly, the amount of uncombusted fuel can be decreased, and the gas turbine can be started up quickly.

In one embodiment of the control apparatus for a gas turbine of the present invention, further including a temperature detection device which is disposed in the periphery of the fuel injection valve closest to the ignition device among the plurality of the fuel injection valves and detects a temperature within the combustor, wherein the control device may inject fuel from the fuel injection valve closest to the ignition device, and then when a temperature detected by the temperature detection device becomes equal to or greater than a prescribed determination temperature, the control device injects fuel from the fuel injection valves other than the fuel injection valve closest to the ignition device. In the case that fuel has begun to combust, the temperature within the combustor rises due to heat generated by the combustion. Therefore, it is possible to determine whether fuel is combusting within the combustor based on the temperature within the combustor. In this embodiment, if the temperature detected by the temperature detecting device becomes a prescribed determination temperature, fuel is injected from the fuel injection valves other than the fuel injection valve closest to the ignition device. In this case, by appropriately setting the determination temperature, the fuel injected from the fuel injection valves can be reliably combusted. Accordingly, it is possible to decrease the amount of uncombusted hydrocarbons discharged from the gas turbine during start up.

In one embodiment of the control apparatus for a gas turbine of the present invention, wherein delay times depending on a distance from the ignition device may be set for each fuel injection valve, and when an elapsed time from when fuel from the fuel injection valve closest to the ignition device is injected becomes equal to or greater than a delay time of one of the fuel injection valves, the control device injects fuel from the fuel injection valve for which that delay time is set. The time that it takes for the flame generated around the ignition device to reach each fuel injection valve is decided in accordance with its distance from the ignition device. Therefore, in this embodiment, by appropriately setting the delay times, fuel can be injected from each fuel injection valve at the time the flame reaches the fuel injection valve. Therefore, it is possible to decrease the amount of fuel injected from the fuel injection valves, and the gas turbine can be started up quickly.

In this embodiment, wherein the delay times may be times at which a flame generated by fuel injected from the fuel injection valve closest to the ignition device is predicted to reach each fuel injection valve. By setting the delay times of the fuel injection valves in this way, fuel can be injected from each fuel injection valve at the time the flame reaches the fuel injection valve.

A start up method for a gas turbine of the present invention applied to a gas turbine including a cylindrical combustor in which air compressed by a compressor is supplied, a plurality of fuel injection valves aligned in a circumferential direction in the combustor which are capable of injecting fuel into the combustor, and an ignition device provided in the combustor which is capable of igniting a fuel-air mixture within the combustor, wherein the operation of the plurality of fuel injection valves is controlled so that when the gas turbine is started up, fuel injection opening times of the fuel injection valves positioned far from the ignition device are later than fuel injection opening times of the fuel injection valves positioned close to the ignition device.

According to the start up method of the present invention, similar to the control apparatus explained above, since the fuel injection opening time of the fuel injection valves located far from the ignition device is later, it is possible to decrease the amount of fuel injected from the fuel injection valves during the period until a flame generated around the ignition device reaches these valves. Therefore, it is possible to decrease the amount of uncombusted hydrocarbons discharged from the gas turbine during start up, and the fuel consumption of the gas turbine can be improved.

In one embodiment of the start up method for a gas turbine of the present invention, wherein when the gas turbine is started up, the fuel injection valves between the fuel injection valve closest to the ignition device and the fuel injection valve farthest from the ignition device may be sequentially opened at prescribed intervals from the fuel injection valve closest to the ignition device toward the fuel injection valve farthest from the ignition device. In this case, since the fuel injection valves are opened in the order in which the flame reaches them, Therefore, fuel injected from the fuel injection valves can be rapidly combusted. Accordingly, it is possible to decrease the amount of fuel injected from the fuel injection valves, and the gas turbine can be started up quickly.

In one embodiment of the start up method for a gas turbine of the present invention, wherein when a temperature within the combustor becomes equal to or greater than a prescribed determination temperature in a state in which fuel is being injected from the fuel injection valve closest to the ignition device, fuel may be injected from the fuel injection valves other than the fuel injection valve closest to the ignition device. In this case, by appropriately setting the determination temperature, fuel injected from the fuel injection valves other than the fuel injection valve closest to the ignition device can be reliably combusted. Accordingly, it is possible to decrease the amount of uncombusted hydrocarbons discharged from the gas turbine during start up.

In one embodiment of the start up method for a gas turbine of the present invention, wherein delay times depending on a distance from the ignition device are set for each fuel injection valve, and when an elapsed time from when fuel from the fuel injection valve closest to the ignition device is injected becomes equal to or greater than a delay time of one of the fuel injection valves, fuel may be injected from the fuel injection valve for which that delay time is set. In this case, by appropriately setting the delay times, fuel can be injected from each fuel injection valve at the time the flame reaches the fuel injection valve. Therefore, it is possible to decrease the amount of fuel injected from the fuel injection valves, and the gas turbine can be started up quickly.

In this embodiment, wherein the delay times may be times at which a flame generated by fuel injected from the fuel injection valve closest to the ignition device is predicted to reach each fuel injection valve. In this case, fuel can be injected from each fuel injection valve at the time the flame reaches the fuel injection valve.

DESCRIPTION OF EMBODIMENTS (First Embodiment)

Figure 1:
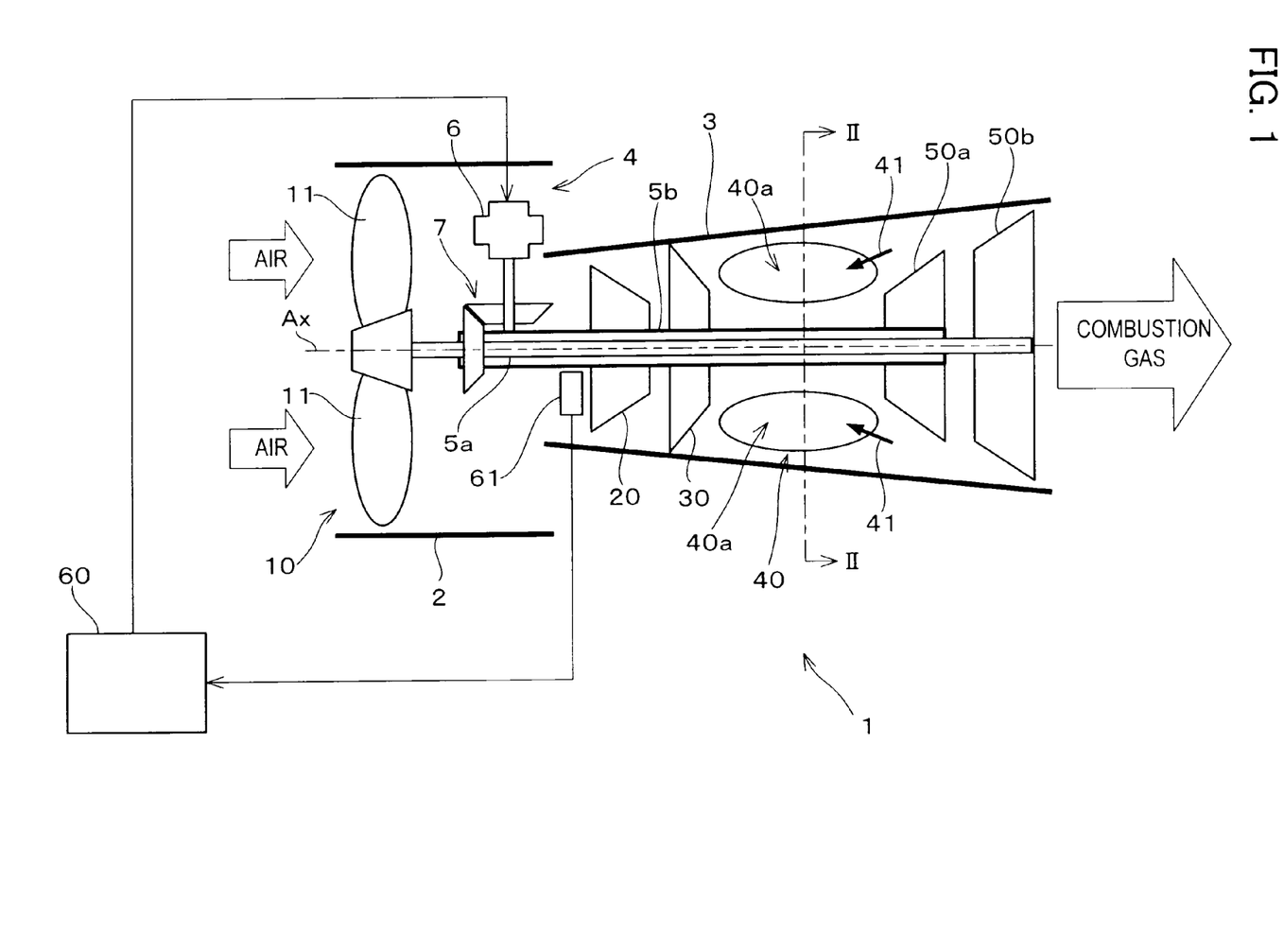
FIG. 1 is a schematic view showing a gas turbine in which a control apparatus according to a first embodiment of the present invention is incorporated.

FIG. 1 is a schematic view of a gas turbine in which a control apparatus according to a first embodiment of the present invention is incorporated. The gas turbine 1 includes a cylindrical outside case 2 and a cylindrical inside case 3 which has a smaller diameter than that of the outside case 2. As shown in FIG. 1, the inside case 3 is provided coaxially inside the outside case 2, and a bypass flow path 4 is formed between the outside case 2 and the inside case 3. The gas turbine 1 also includes a fan 10, a low pressure compressor 20, a high pressure compressor 30, a combustor 40, a high pressure turbine 50a and a low pressure turbine 50b. A low speed shaft 5a and a high speed shaft 5b rotatably provided around an axis Ax pass through the center area of the above-mentioned members. The fan 10 is disposed on the outside of the inside case 3, and the other members are disposed within the inside case 3. As shown in FIG. 1, a starter 6 is provided to the gas turbine 1 as a start up device. The starter 6 is a publicly known electric motor. The starter 6 and the high speed shaft 5b are connected by a power transmission mechanism 7 such that rotation can be transmitted mutually between them. The starter 6 is rotatably driven by the high speed shaft 5b during driving of the gas turbine 1 to function as a generator.

The fan 10 includes a plurality of fan blades 11. The plurality of fan blades 11 are provided on one end of the low speed shaft 5a to rotate integrally with the low speed shaft 5a.

The low pressure compressor 20 is constituted as an axial compressor including a plurality of rotor blades (not shown) which rotate integrally with the high speed shaft 5b and a plurality of stator blades (not shown) which are fixed to the inside case 3 so that they cannot rotate. An intake port of the low pressure compressor 20 is provided below the fan 10, and an exhaust port is connected to an intake port of the high pressure compressor 30. The high pressure compressor 30 is constituted as a centrifugal compressor including an impeller (not shown) which rotates integrally with the high speed shaft 5b. An exhaust port of the high speed compressor 30 is connected to an intake port of the combustor 40.

Figure 2:
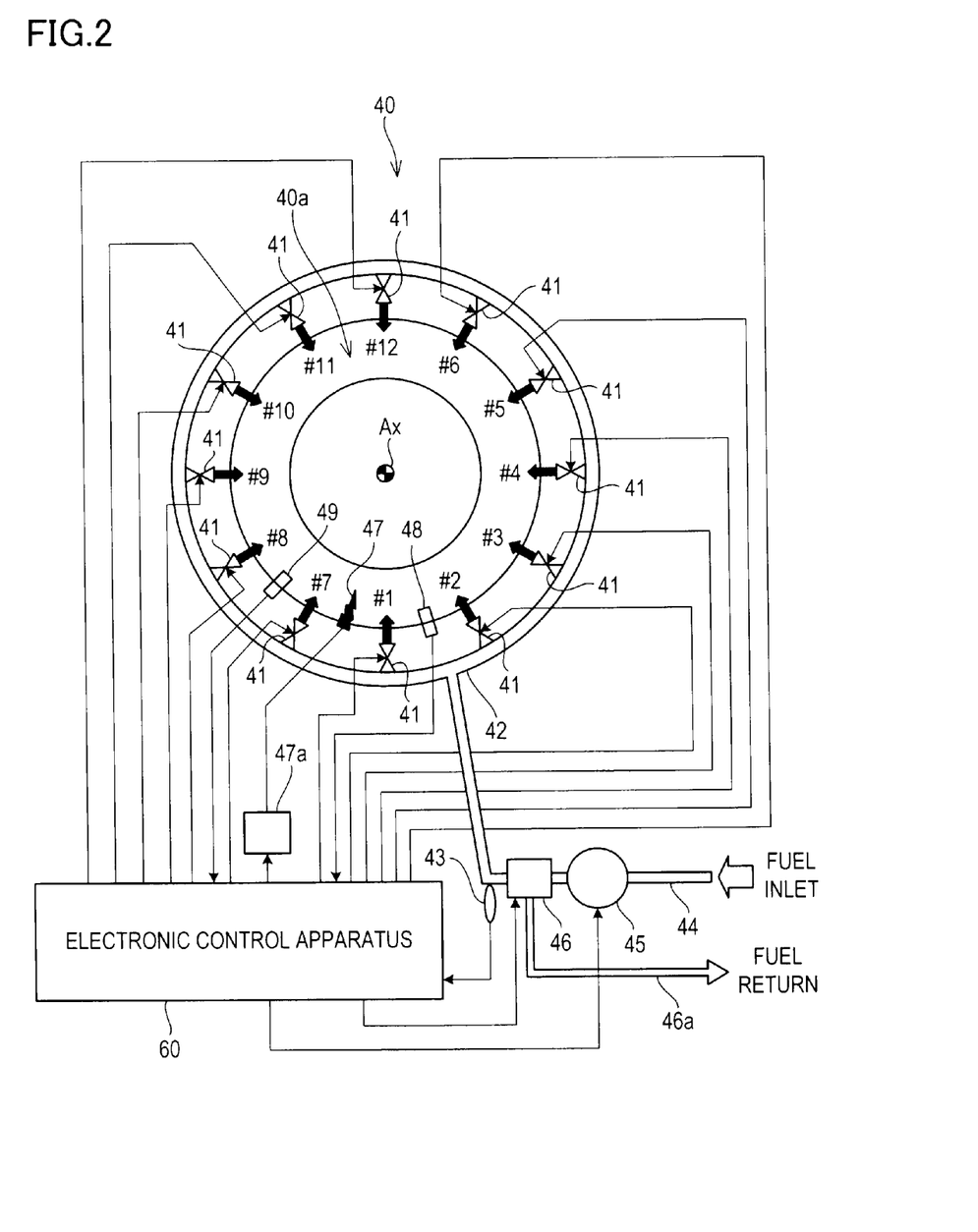
FIG. 2 is a view showing a cross-section of a combustor along the line II-II of FIG. 1.

The combustor 40 is formed in a ring shape centered on the axis Ax. FIG. 2 shows a cross-section of the combustor 40 at line II-II in FIG. 1. As shown in FIG. 2, a plurality (twelve in FIG. 2) of fuel injection valves 41 are disposed in the combustor 40 so that fuel can be injected into its inner part 40a. The fuel injection valves 41 are arranged at equal intervals in the circumferential direction. The fuel injection valves 41 are assigned a number from #1 to #12 respectively to distinguish them. The fuel injection valves 41 are constituted such that they can be switched from an open state in which they inject fuel into the combustor 41 and a closed state in which injection is stopped. The plurality of fuel injection valves 41 are connected to a common fuel supply pipe 42. A fuel pressure sensor 43 which outputs signals corresponding to the inside pressure is provided to the fuel supply pipe 42. The fuel supply pipe 42 is connected to a fuel tank (not shown) by a fuel passage 44. A fuel pump 45 for sending fuel from the fuel tank to the fuel supply pipe 42 and a flow control apparatus 46 for controlling the flow amount of fuel sent to the fuel supply pipe 42 are provided in the fuel passage 44. The flow control apparatus 46 includes a return passage 46a for returning unnecessary fuel to the fuel tank.

An ignition plug 47 is provided to the combustor 40 as an ignition device which is capable of igniting the fuel-air mixture within the combustor 40. The ignition plug 47 is provided between the #1 and #7 fuel injection valves 41 so that its distance to the #1 fuel injection valve 41 and its distance to the #7 fuel injection valve 41 is approximately the same. A first temperature sensor 48 and a second temperature sensor 49 which output signals corresponding to the temperature within the combustor 40 are provided to the combustor 40. As shown in FIG. 2, the first temperature sensor 48 is provided between the #1 fuel injection valve 41 and the #2 fuel injection valve 41. The second temperature sensor 49 is provided between the #7 fuel injection valve 41 and the #8 fuel injection valve 41.

Returning to FIG. 1, the gas turbine 1 will now be explained below. An exhaust port of the combustor 40 is connected to an intake port of the high pressure turbine 50a. The high pressure turbine 50a is constituted as an axial turbine including a plurality of rotor blades (not shown) which rotate integrally with the high speed shaft 5b and a plurality of stator blades (not shown) which are fixed to the inside case 3 so that they cannot rotate. An exhaust port of the high pressure turbine 50a is connected to an intake port of the low pressure turbine 50b, and gas which has left the high pressure turbine 50a is sent to the low pressure turbine 50b. The low pressure turbine 50b includes a plurality of rotor blades (not shown) which rotate integrally with the low speed shaft 5a and a plurality of stator blades (not shown) which are fixed so that they cannot rotate. An exhaust port of the low pressure turbine 50b is opened to the atmosphere. These parts are the same as those of publicly known gas turbines, and thus a detailed explanation thereof will be omitted.

In the gas turbine 1, air is taken into the outside case 2 by the fan 10. A portion of the air which has been taken in is sent to the low pressure compressor 20 and the remainder is sent to the bypass flow path 4. The air which is sent to the low pressure compressor 20 is compressed by the low pressure compressor 20 and the high pressure compressor 30 and then sent to the combustor 40. In the combustor 40, fuel is injected into the compressed air to combust the fuel. Combustion gas is sent to the high pressure turbine 50a to drive the high pressure turbine 50a. Thereby, the high speed shaft 5b is driven and power is generated. Gas discharged from the high speed turbine 50a further drives the low speed turbine 50b. Thereby, the low speed shaft 5a is rotatably driven and the fan 10 is driven.

The operation of the fuel injection valves 41, the fuel pump 45, the ignition plug 47, and the starter 6 is controlled by an electronic control apparatus 60 which serves as the control device. The electronic control apparatus 60 is constituted as a computer including a microprocessor and peripheral devices such as RAM and ROM necessary for operating the microprocessor. The electronic control apparatus 60 controls the driving state of the gas turbine 1 based on the output signals from various types of sensors. For example, the electronic control apparatus 60 controls the operation of the flow control apparatus 46 based on the output signals of the fuel pressure sensor 43 so that the fuel pressure within the fuel supply pipe 42 is maintained at a prescribed pressure. The electronic control apparatus 60 controls the operation of the ignition plug 47 via an igniter 47a. For example, a rotation number sensor 61 (see FIG. 1), which outputs a signal corresponding to the number of rotations of the high speed shaft 5b, or the like is connected to the electronic control apparatus 60. Further, the fuel pressure sensor 43, the first temperature sensor 48, and the second temperature sensor 49 are also connected to the electronic control apparatus 60. In addition to the above sensors, various sensors such as an engine temperature sensor which outputs a signal corresponding to the temperature of the gas turbine 1, an atmospheric temperature sensor which outputs a signal corresponding to the temperature of the atmosphere, an atmospheric pressure sensor which outputs a signal corresponding to the atmospheric pressure, and the like are connected to the electronic control apparatus 60, but they are omitted in the figure.

Figure 3:
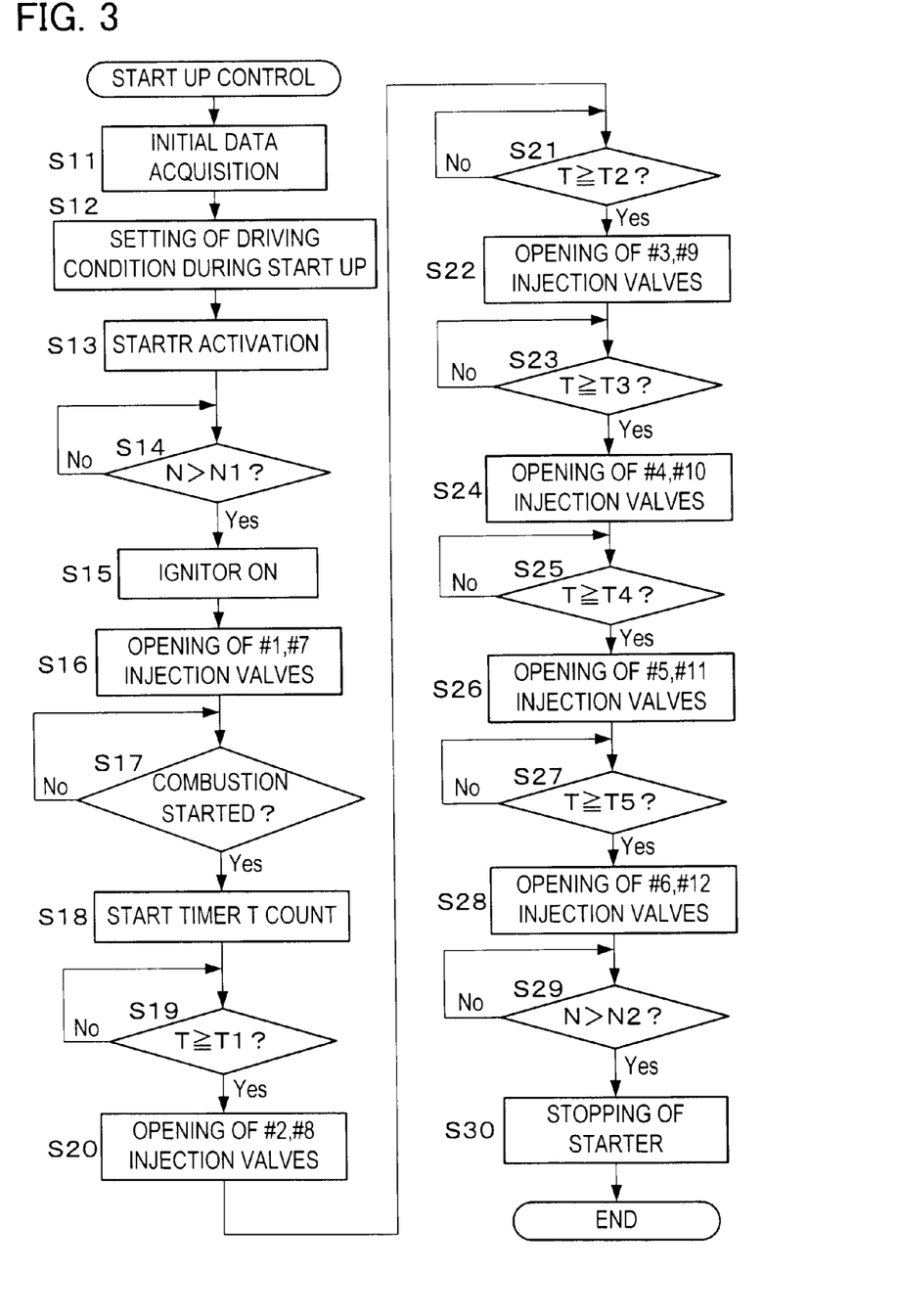
FIG. 3 is a flowchart showing a start up control routine executed by the electronic control apparatus of FIG. 1.

FIG. 3 shows a start up control routine executed by the electronic control apparatus 60 for starting up the gas turbine 1. This control routine is executed when the gas turbine 1 is stopped in the case that, for example, prescribed start up conditions have been satisfied such as a start up switch has been pushed. The control routine is executed in parallel with other routines executed by the electronic control apparatus 60.

Figure 4:
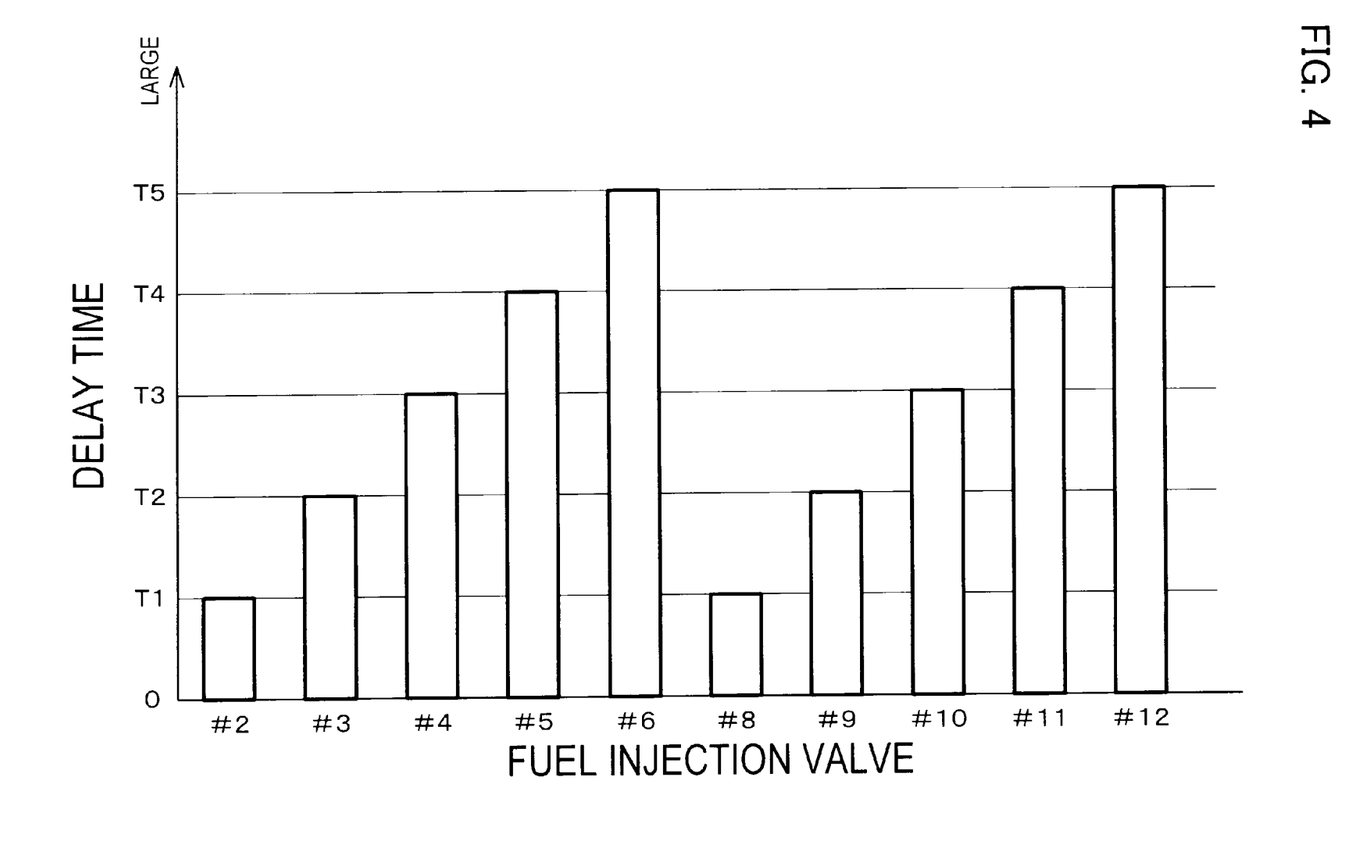
FIG. 4 is a view showing one example of valve opening times of the fuel injection valves in the first embodiment.

In this control routine, the electronic control apparatus 60 first acquires initial data in step S11. As initial data, for example, the temperature of the gas turbine 1, the temperature of the atmosphere, the atmospheric pressure, and the like are acquired. Next, in step S12, the electronic control apparatus 60 sets the driving conditions of the gas turbine 1 during start up. As the driving conditions, for example, the opening time of each fuel injection valve 41, a target value for the pressure of the fuel within the fuel supply pipe 42, and the like are set. The electronic control apparatus 60 sets the opening time of each fuel injection valve 41 referring to the map shown in FIG. 4. FIG. 4 shows the opening times of the #2 to #6 and #8 to #12 fuel injection valves 41 in the case that the time at which fuel injected from the #1 and #7 fuel injection valves 41 begins to combust within the combustor 40 (hereinafter, this may be called the "combustion start time") is used as a reference. As shown in FIG. 4, the opening times of the #2 and #8 fuel injection valves 41 are set at a time delayed by a delay time T1 from the combustion start time. The opening times of the #3 and #9 fuel injection valves 41 are set at a time delayed by a delay time T2 from the combustion start time, and the opening times of the #4 and #10 fuel injection valves 41 are set at a time delayed by a delay time T3 from the combustion start time. The opening times of the #5 and #11 fuel injection valves 41 are set at a time delayed by a delay time T4 from the combustion start time, and the opening times of the #6 and #12 fuel injection valves 41 are set at a time delayed by a delay time T5 from the combustion start time. As shown in FIG. 4, the delay times T1 to T5 are set so as to be in a relationship of T1<T2<T3<T4<T5. In this way, the opening time of each fuel injection valve 41 is set so as to become more delayed the farther the valve is from the ignition plug 47. The delay times T1 to T5 are appropriately set based on the time at which the flame generated around the ignition plug 47 is predicted to reach each fuel injection valve 41. The relationship shown in FIG. 4 may be, for example, calculated in advance by experimentation or numerical calculations and stored in the ROM of the electronic control apparatus 60. The opening times may be corrected based on the temperature of the gas turbine 1 at start up, the temperature of the atmosphere, the atmospheric pressure, and the like. The target value of the pressure of the fuel may be set by a publicly known method for setting based on the acquired initial data or the like.

In the next step S13, the electronic control apparatus 60 activates the starter 6 to rotate the high speed shaft 5b. In step S14, the electronic control apparatus 60 determines whether the number of rotations N of the high speed shaft 5b is higher than a prescribed first number of rotations N1 set in advance. As the first number of rotations N1, for example, a number of rotations at which fuel injected within the combustor 40 can be ignited and combusted is set. The electronic control apparatus 60 repeatedly executes this process until the number of rotations N of the high speed shaft 5b becomes higher than the first number of rotations N1.

When the number of rotations N of the high speed shaft 5b is determined to be higher than the first number of rotations N1, the routine proceeds to step S15, and the electronic control apparatus 60 controls the igniter 47a so that sparks are continuously generated from the ignition plug 47. Next, in step S16, the electronic control apparatus 60 opens the #1 and #7 fuel injection valves 41. Thereby, fuel begins to be injected into the combustor 40 from the #1 and #7 fuel injection valves 41. In step S17, the electronic control apparatus 60 determines whether fuel injected into the combustor 40 from the #1 and #7 fuel injection valves 41 has begun to combust. In this process, the electronic control apparatus 60 determines that fuel is combusting in the case that a temperature detected by at least one of the first temperature sensor 48 and the second temperature sensor 49 is equal to or greater than a determination temperature set in advance. As the determination temperature, for example, a temperature such as 800° C. or the like at which it can be determined that fuel is combusting if the detected temperature is equal to or greater than this temperature is appropriately set. The electronic control apparatus 60 repeatedly executes this process until it is determined that fuel has begun to combust.

When it has been determined that fuel has begun to combust, the routine proceeds to step S18, and the electronic control apparatus 60 resets a timer T for measuring the elapsed time from when the fuel in the combustor 40 begins to combust, and then starts a count by the timer T. Next, in step S19, the electronic control apparatus 60 determines whether the value of the timer T is equal to or greater than the delay time T1. The electronic control apparatus 60 repeatedly executes this process until the value of the timer T is equal to or greater than the delay time T1. When the value of the timer T is determined to be equal to or greater than the delay time T1, the routine proceeds to step S20, and the electronic control apparatus 60 opens the #2 and #8 fuel injection valves 41.

Next, in step S21, the electronic control apparatus 60 determines whether the value of the timer T is equal to or greater than the delay time T2. The electronic control apparatus 60 repeatedly executes this process until the value of the timer T is equal to or greater than the delay time T2. In contrast, when the value of the timer T is determined to be equal to or greater than the delay time T2, the routine proceeds to step S22, and the electronic control apparatus 60 opens the #3 and #9 fuel injection valves 41. Next, in step S23, the electronic control apparatus 60 determines whether the value of the timer T is equal to or greater than the delay time T3. The electronic control apparatus 60 repeatedly executes this process until the value of the timer T is equal to or greater than the delay time T3. Meanwhile, when the value of the timer T is determined to be equal to or greater than the delay time T3, the routine proceeds to step S24, and the electronic control apparatus 60 opens the #4 and #10 fuel injection valves 41.

Next, in step S25, the electronic control apparatus 60 determines whether the value of the timer T is equal to or greater than the delay time T4. The electronic control apparatus 60 repeatedly executes this process until the value of the timer T is equal to or greater than the delay time T4. Meanwhile, when the value of the timer T is determined to be equal to or greater than the delay time T4, the routine proceeds to step S26, and the electronic control apparatus 60 opens the #5 and #11 fuel injection valves 41. Next, in step S27, the electronic control apparatus 60 determines whether the value of the timer T is equal to or greater than the delay time T5. The electronic control apparatus 60 repeatedly executes this process until the value of the timer T is equal to or greater than the delay time T5. Meanwhile, when the value of the timer T is determined to be equal to or greater than the delay time T5, the routine proceeds to step S28, and the electronic control apparatus 60 opens the #6 and #12 fuel injection valves 41.

Next, in step S29, the electronic control apparatus 60 determines whether the number of rotations N of the high speed shaft 5b is higher than a prescribed second number of rotations N2 set in advance. As the second number of rotations N2, a number of rotations at which the gas turbine 1 does not stop even if the starter 6 is stopped, or in other words a number of rotations at which the gas turbine 1 can independently run, is set. The electronic control apparatus 60 repeatedly executes this process until the number of rotations N of the high speed shaft 5b becomes higher than the second number of rotations N2. Meanwhile, when the number of rotations N of the high speed shaft 5b is determined to be higher than the second number of rotations N2, the routine proceeds to step S30, and the electronic control apparatus 60 stops the starter 6. Subsequently, this control routine is ended.

In the first embodiment, the opening time of the #6 and #12 fuel injection valves 41 which are far from the ignition plug 47 is later than the opening time of the #1 and #7 fuel injection valves 41 which are close to the ignition plug 47. As shown in FIG. 4, the opening time of each fuel injection valve 41 is set so as to be later the farther the valve is from the ignition plug 47. As is well known, the flame for combustion is generated around the ignition plug 47, and then spreads outwards. Therefore, by setting the opening times of the fuel injection valves 41 to be later the farther the valve is from the ignition plug 47, it is possible to decrease the amount of fuel injected from the fuel injection valves 41 until the flame reaches each valve. The #2 to #6 and #8 to #12 fuel injection valves 41 are opened at a time at which the flame is predicted to reach them, and thus fuel injected from these fuel injection valves 41 can be quickly combusted. Thereby, the amount of uncombusted fuel can be decreased, and thus it is possible to decrease the amount of uncombusted hydrocarbons which is discharged from the gas turbine during start up. Since the amount of fuel injected from the fuel injection valves 41 during start up can be decreased, the fuel consumption of the gas turbine 1 can be improved.

In this embodiment, once a temperature detected by at least one of the first temperature sensor 48 and the second temperature sensor 49 becomes equal to or greater than the determination temperature, or in other words once the ignition of fuel injected from the #1 and #7 fuel injection valves 41 is confirmed, the #2 to #6 and #8 to #12 fuel injection valves 41 are opened. Therefore, it is possible to decrease the amount of fuel which is discharged from gas turbine 1 in an uncombusted state within fuel injected from the #2 to #6 and #8 to #12 fuel injection valves 41.

(Second Embodiment)

Figure 5:
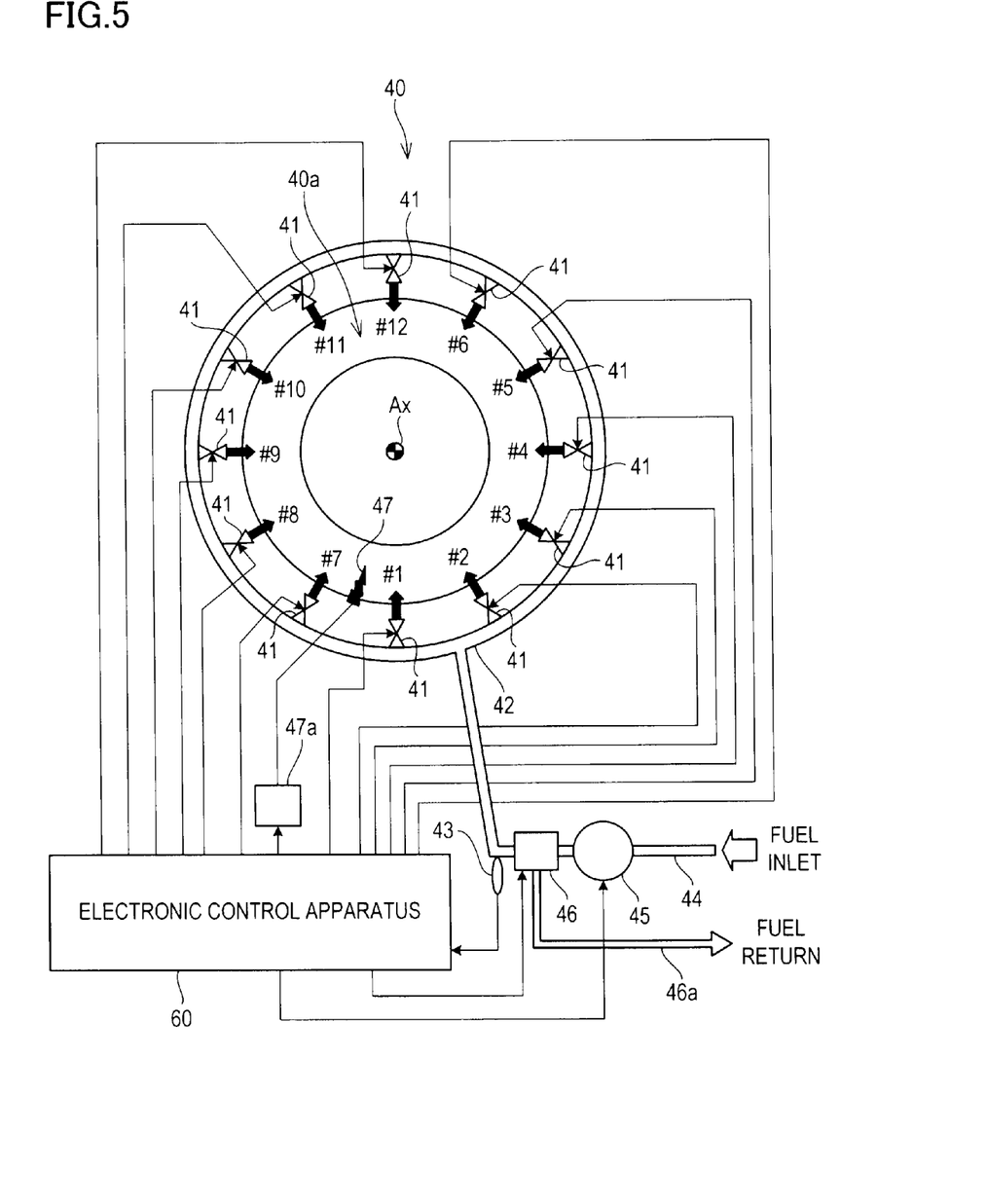
FIG. 5 is a view showing a cross-section of a combustor of a gas turbine in which a control apparatus according to a second embodiment of the present invention is incorporated.
Figure 6:
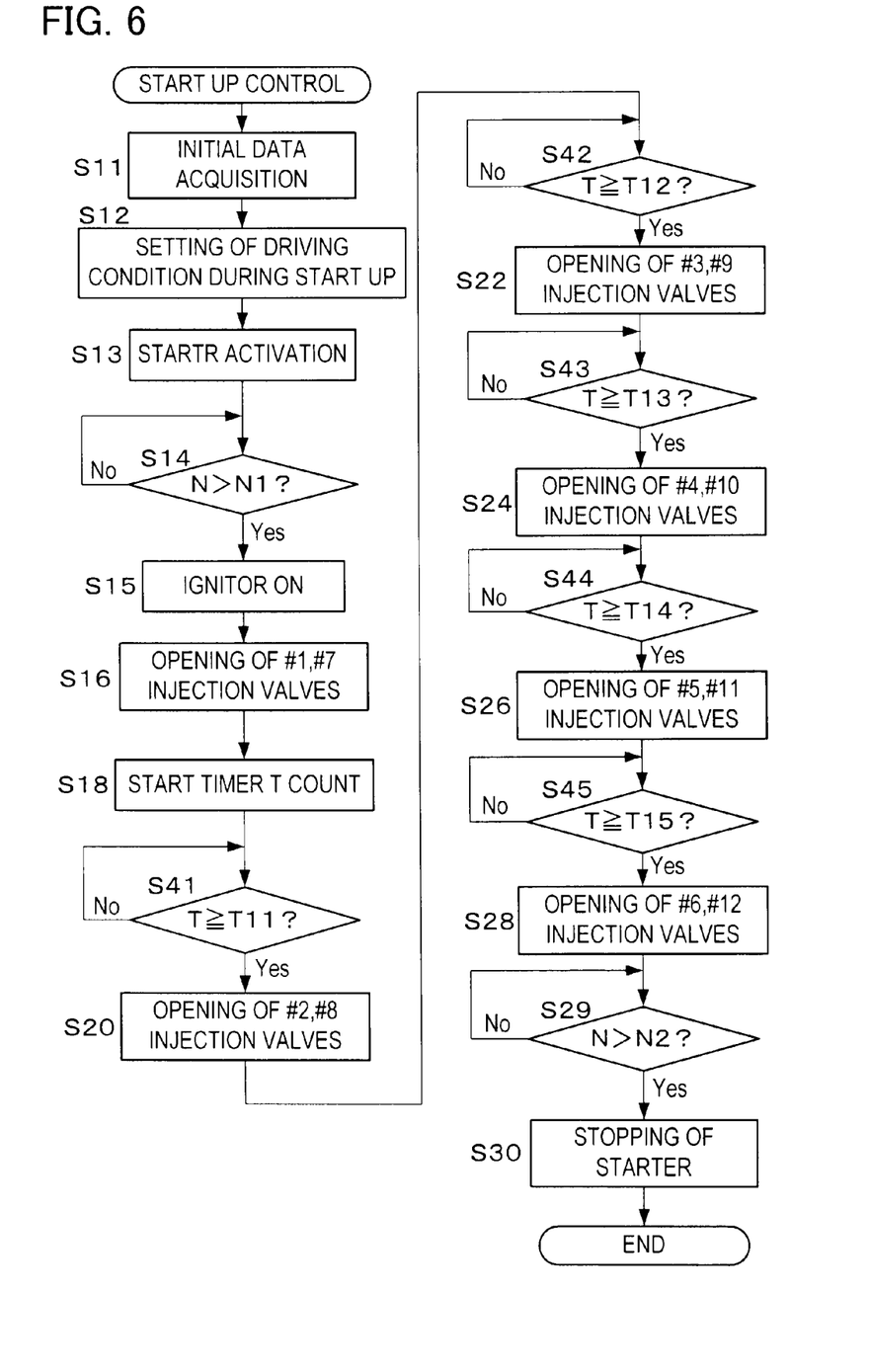
FIG. 6 is flowchart showing a start up control routine executed by the electronic control apparatus of FIG. 5.
Figure 7:
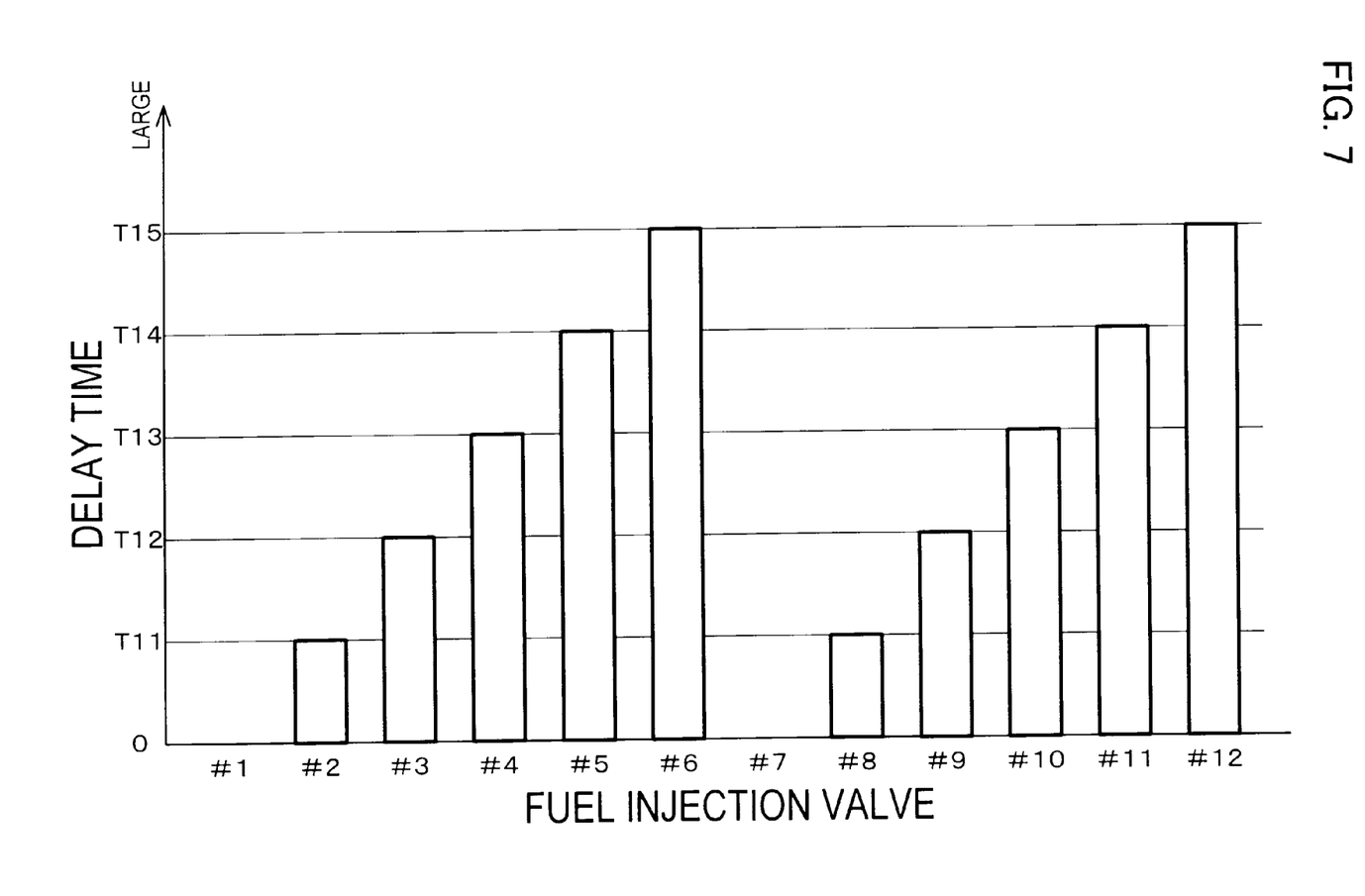
FIG. 7 is a view showing one example of valve opening times of the fuel injection valves in the second embodiment.

A control apparatus according to a second embodiment of the present invention will be explained below referring to FIGS. 5 to 7. FIG. 5 shows a cross-section of the combustor 40 in this embodiment. In this embodiment, the other parts of the gas turbine 1 are referred to FIG. 1. As shown in FIG. 5, in this embodiment, the first temperature sensor 48 and the second temperature sensor 49 are omitted, but otherwise this embodiment is the same as the first embodiment. Therefore, the same components as those in the first embodiment are denoted by the same reference numerals, and explanations thereof will be omitted. FIG. 6 shows a start up control routine executed by the electronic control apparatus 60 of this embodiment. Similar to the first embodiment, this start up control routine is also executed in the case that prescribed start up conditions have been satisfied. This start up control routine is also executed in parallel with other routines executed by the electronic control apparatus 60.

In the control routine of FIG. 6, the electronic control apparatus 60 first acquires initial data in step S11. Next, in step S12, the electronic control apparatus 60 sets the driving conditions of the gas turbine 1 during start up. In this process, the electronic control apparatus 60 sets the opening time of each fuel injection valve 41 based on the map shown in FIG. 7. FIG. 7 shows the opening times of the fuel injection valves 41 in the case that the opening time of the #1 and #7 fuel injection valves 41 is used as a reference. The opening times of the #2 to #6 and #8 to #12 fuel injection valves 41 are set at a time at which the flame generated by fuel injected from the #1 and #7 fuel injection valves 41 is predicted to reach each fuel injection valve 41. Therefore, the delay time T11 of the #2 and #8 fuel injection valves 41 is set at a predicted time from the opening time of the #1 and #7 fuel injection valves 41 until a time at which the flame generated by fuel injected from the #1 and #7 fuel injection valves 41 is predicted to reach the #2 and #8 fuel injection valves 41. The other delay times T12 to T15 are similarly set at predicted times from the opening time of the #1 and #7 fuel injection valves 41 until at time at which the flame is predicted to reach the #3 to #6 and #9 to #12 fuel injection valves 41. As shown in FIG. 7, the delay times T11 to T15 are set so as to be in a relationship of T11<T12<T13<T14<T15. The delay times T11 to T15 may be calculated in advance by experimentation or numerical calculations and stored in the ROM of the electronic control apparatus 60. In this embodiment, the opening times may be corrected similar to the first embodiment based on the temperature of the gas turbine 1 at start up, the temperature of the atmosphere, the atmospheric pressure, and the like.

Subsequently, the electronic control apparatus 60 proceeds with the processes from steps S13 to S16 which are identical to those of the control routine of FIG. 3. Next, in step S18, the electronic control apparatus 60 resets a timer T for measuring the elapsed time from when the #1 and #7 fuel injection valves 41 were opened, and then starts a count by the timer T.

Next, in step S41, the electronic control apparatus 60 determines whether the value of the timer T is equal to or greater than the delay time T11. The electronic control apparatus 60 repeatedly executes this process until the value of the timer T is equal to or greater than the delay time T11. When the value of the timer T is determined to be equal to or greater than the delay time T11, the routine proceeds to step S20, and the electronic control apparatus 60 opens the #2 and #8 fuel injection valves 41.

Next, in step S42, the electronic control apparatus 60 determines whether the value of the timer T is equal to or greater than the delay time T12. The electronic control apparatus 60 repeatedly executes this process until the value of the timer T is equal to or greater than the delay time T12. Meanwhile, when the value of the timer T is determined to be equal to or greater than the delay time T12, the routine proceeds to step S22, and the electronic control apparatus 60 opens the #3 and #9 fuel injection valves 41. Next, in step S43, the electronic control apparatus 60 determines whether the value of the timer T is equal to or greater than the delay time T13. The electronic control apparatus 60 repeatedly executes this process until the value of the timer T is equal to or greater than the delay time T13. Meanwhile, when the value of the timer T is determined to be equal to or greater than the delay time T13, the routine proceeds to step S24, and the electronic control apparatus 60 opens the #4 and #10 fuel injection valves 41.

Next, in step S44, the electronic control apparatus 60 determines whether the value of the timer T is equal to or greater than the delay time T14. The electronic control apparatus 60 repeatedly executes this process until the value of the timer T is equal to or greater than the delay time T14. Meanwhile, when the value of the timer T is determined to be equal to or greater than the delay time T14, the routine proceeds to step S26, and the electronic control apparatus 60 opens the #5 and #11 fuel injection valves 41. Next, in step S45, the electronic control apparatus 60 determines whether the value of the timer T is equal to or greater than the delay time T15. The electronic control apparatus 60 repeatedly executes this process until the value of the timer T is equal to or greater than the delay time T15. Meanwhile, when the value of the timer T is determined to be equal to or greater than the delay time T15, the routine proceeds to step S28, and the electronic control apparatus 60 opens the #6 and #12 fuel injection valves 41. Subsequently, the electronic control apparatus 60 executes the processes of steps S29 and S30, and then this control routine is ended.

In the second embodiment, the opening time of each fuel injection valve 41 is set so as to become more delayed the farther the valve is from the ignition plug 47. Therefore, it is possible to decrease the amount of fuel injected from the #2 to #6 and #8 to #12 fuel injection valves 41 until the flame reaches each valve. Thereby, it is possible to decrease the amount of uncombusted hydrocarbons which is discharged from the gas turbine 1 during start up. Since the amount of fuel injected during start up can be decreased, the fuel consumption of the gas turbine 1 can be improved. Further, in this embodiment, it is not necessary to provide temperature sensors to the combustor 40, and thus the costs can be reduced.

The present invention is not limited to the above-described embodiments, and may be embodied in various forms. For example, the number of fuel injection valves of the gas turbine to which the control apparatus of the present invention is applied is not limited to 12. The present invention may be applied to a gas turbine in which a plurality of fuel injection valves is provided around the combustor.

The present invention may also be applied to a gas turbine in which two or more ignition plugs are provided to the combustor. In this case, the order in which the fuel injection valves are opened is not limited to the order described in the above embodiments. For example, in the case that an ignition plug is also provided between the #1 and #2 fuel injection valves in addition to between the #1 and #7 fuel injection valves in the combustor of FIG. 2, the fuel injection valves may be opened in the following order: the #1, #2, and #7 fuel injection valves are opened first, and then the #3 and #8 fuel injection valves, the #4 and #9 fuel injection valves, and finally the #5 and #10 fuel injection valves. In the case that an ignition plug is also provided between the #6 and #12 fuel injection valves in addition to between the #1 and #7 fuel injection valves in the combustor of FIG. 2, the fuel injection valves may be opened in the following order: the #1, #6, #7, and #12 fuel injection valves are opened first, and then the #2, #5, #8, #11 fuel injection valves, and finally the #3, #4, #9, and #10 fuel injection valves. In other words, in the present invention, the operation of the fuel injection valves may be controlled such that the opening times of the fuel injection valves which are positioned far from the ignition plugs are later than the opening times of the fuel injection valves which are positioned close to the ignition plugs. In these cases as well, since the amount of uncombusted fuel can be decreased, the amount of uncombusted hydrocarbons which is discharged from the gas turbine during start up can be decreased. Since the amount of fuel injected during start up can be decreased, the fuel consumption of the gas turbine can be improved.

The invention claimed is:

1. A control apparatus applied to a gas turbine, the gas turbine includes:
   a combustor in which air compressed by a compressor is supplied, the combustor having a combustion chamber, a shape of the combustion chamber being cylindrical;
   a plurality of fuel injection valves aligned in a circumferential direction in the combustor, the plurality of fuel injection valves being capable of injecting fuel into the combustor; and
   an ignition device provided in the combustor, the ignition device being capable of igniting a fuel-air mixture within the combustor,
   the control apparatus comprising:
   a control device which controls the operation of the plurality of fuel injection valves so that when the gas turbine is started up, fuel injection opening times of the fuel injection valves positioned far from the ignition device are later than fuel injection opening times of the fuel injection valves positioned close to the ignition device; and
   a temperature detection device which is disposed in the periphery of the fuel injection valve closest to the ignition device among the plurality of the fuel injection valves and detects a temperature within the combustor, wherein
   the control device controls the fuel injection valve closest to the ignition device to inject the fuel, and then when a temperature detected by the temperature detection device becomes equal to or greater than a prescribed determination temperature in a state in which fuel is being injected from the fuel injection valve closest to the ignition device, the control device controls the fuel injection valves other than the fuel injection valve closest to the ignition device to inject the fuel.

2. The control apparatus according to claim 1, wherein the control device controls the operation of the plurality of fuel injection valves so that the fuel injection valves between the fuel injection valve closest to the ignition device and the fuel injection valve farthest from the ignition device are sequentially opened at prescribed intervals from the fuel injection valve closest to the ignition device toward the fuel injection valve farthest from the fuel injection device.

3. A control apparatus applied to a gas turbine, the gas turbine includes:
   a combustor in which air compressed by a compressor is supplied, the combustor having a combustion chamber, a shape of the combustion chamber being cylindrical;
   a plurality of fuel injection valves aligned in a circumferential direction in the combustor, the plurality of fuel injection valves being capable of injecting fuel into the combustor; and
   an ignition device provided in the combustor, the ignition device being capable of igniting a fuel-air mixture within the combustor,
   the control apparatus comprising:
   a control device which controls the operation of the plurality of fuel injection valves so that when the gas turbine is started up, fuel injection opening times of the fuel injection valves positioned far from the ignition device are later than fuel injection opening times of the fuel injection valves positioned close to the ignition device, wherein
   delay times are set for each fuel injection valve, the delay times depending on a distance from the ignition device, and
   when an elapsed time from when fuel from the fuel injection valve closest to the ignition device is injected becomes equal to or greater than a delay time of one of the fuel injection valves, the control device injects fuel from the fuel injection valve for which that delay time is set.

4. The control apparatus according to claim 3, wherein the delay times are times at which a flame generated by fuel injected from the fuel injection valve closest to the ignition device is predicted to reach each fuel injection valve.

5. The control apparatus according to claim 3, wherein the control device controls the operation of the plurality of fuel injection valves so that the fuel injection valves between the fuel injection valve closest to the ignition device and the fuel injection valve farthest from the ignition device are sequentially opened at prescribed intervals from the fuel injection valve closest to the ignition device toward the fuel injection valve farthest from the fuel injection device.

6. A start up method applied to a gas turbine, the gas turbine includes:
   a combustor in which air compressed by a compressor is supplied, the combustor having a combustion chamber, a shape of the combustion chamber being cylindrical;
   a plurality of fuel injection valves aligned in a circumferential direction in the combustor, the plurality of fuel injection valves being capable of injecting fuel into the combustor; and
   an ignition device provided in the combustor which is capable of igniting a fuel-air mixture within the combustor, the start up method comprising:
   controlling the operation of the plurality of fuel injection valves so that when the gas turbine is started up, fuel injection opening times of the fuel injection valves positioned far from the ignition device are later than fuel injection opening times of the fuel injection valves positioned close to the ignition device, wherein when a temperature within the combustor becomes equal to or greater than a prescribed determination temperature in a state in which fuel is being injected from the fuel injection valve closest to the ignition device, fuel is injected from the fuel injection valves other than the fuel injection valve closest to the ignition device.

7. The start up method according to claim 6, wherein when the gas turbine is started up, the fuel injection valves between the fuel injection valve closest to the ignition device and the fuel injection valve farthest from the ignition device are sequentially opened at prescribed intervals from the fuel injection valve closest to the ignition device toward the fuel injection valve farthest from the fuel injection device.

8. A start up method applied to a gas turbine, the as turbine includes:
- a combustor in which air compressed by a compressor is supplied, the combustor having a combustion chamber, a shape of the combustion chamber being cylindrical;
- a plurality of fuel injection valves aligned in a circumferential direction in the combustor, the plurality of fuel injection valves being capable of injecting fuel into the combustor; and
- an ignition device provided in the combustor which is capable of igniting a fuel-air mixture within the combustor, the start up method comprising:
- controlling the operation of the plurality of fuel injection valves so that when the gas turbine is started up, fuel injection opening times of the fuel injection valves positioned far from the ignition device are later than fuel injection opening times of the fuel injection valves positioned close to the ignition device, wherein delay times are set for each fuel injection valve, the delay times depending on a distance from the ignition device, and when an elapsed time from when fuel from the fuel injection valve closest to the ignition device is injected becomes equal to or greater than a delay time of one of the fuel injection valves, fuel is injected from the fuel injection valve for which that delay time is set.

9. The start up method according to claim 8, wherein the delay times are times at which a flame generated by fuel injected from the fuel injection valve closest to the ignition device is predicted to reach each fuel injection valve.

10. The start up method according to claim 8, wherein when the gas turbine is started up, the fuel injection valves between the fuel injection valve closest to the ignition device and the fuel injection valve farthest from the ignition device are sequentially opened at prescribed intervals from the fuel injection valve closest to the ignition device toward the fuel injection valve farthest from the fuel injection device.

* * * * *